US012620108B2

(12) United States Patent
Brown-Kramer et al.

(10) Patent No.: US 12,620,108 B2
(45) Date of Patent: May 5, 2026

(54) PRIVACY PRESERVATION SYSTEM

(71) Applicant: Ocuvera LLC, Lincoln, NE (US)

(72) Inventors: Joshua M. Brown-Kramer, Lincoln, NE (US); Steve Kiene, Lincoln, NE (US); Benjamin D. Rush, Lincoln, NE (US); Lucas A. Sabalka, Lincoln, NE (US); Jacob Williams, Lincoln, NE (US)

(73) Assignee: Ocuvera LLC, Lincoln, NE (US)

( * ) Notice: Subject to any disclaimer, the term of this patent is extended or adjusted under 35 U.S.C. 154(b) by 282 days.

(21) Appl. No.: 18/469,057

(22) Filed: Sep. 18, 2023

(65) Prior Publication Data

US 2024/0095938 A1      Mar. 21, 2024

Related U.S. Application Data

(60) Provisional application No. 63/376,309, filed on Sep. 20, 2022.

(51) Int. Cl.
G06T 7/50              (2017.01)
(52) U.S. Cl.
CPC ...... G06T 7/50 (2017.01); *G06T 2207/10024* (2013.01); *G06T 2207/10028* (2013.01); *G06T 2207/10048* (2013.01); *G06T 2207/20081* (2013.01); *G06T 2207/20084* (2013.01)
(58) Field of Classification Search
CPC ............. G06T 7/50; G06T 2207/10024; G06T 2207/10028; G06T 2207/10048; G06T 2207/20081; G06T 2207/20084

USPC ......................................................... 382/103
See application file for complete search history.

(56) References Cited

PUBLICATIONS

Amini Raoofpour, Ali. Detecting"getting up" behavior of a person from a bed: using neural network and depth data. Diss. Wien, 2020. (Year: 2020).*

* cited by examiner

*Primary Examiner* — Jonathan S Lee
(74) *Attorney, Agent, or Firm* — Ryan T. Grace; Advent, LLP

(57) ABSTRACT

A system comprises a computer including one or more processors and memory. The memory includes instructions such that the one or more processors are programmed to receive at least one of Red-Green-Blue (RGB) image data or infrared (IR) image data from one or more cameras communicatively connected to the one or more processors, where the RGB image data and the IR image data represents an environment including at least one individual disposed along a support surface. The one or more processors receive annotated depth image data that corresponds to the RGB image data and the IR image data. The one or more processors train a neural network with at least one of the RGB image data and the IR image data corresponding to the annotated depth image data, where the neural network is trained to predict when the individual is exiting the support surface.

20 Claims, 6 Drawing Sheets

PRIVACY PRESERVATION SYSTEM

CROSS-REFERENCE TO RELATED APPLICATION

This application claims priority to U.S. Provisional Application No. 63/376,309, filed Sep. 20, 2022. The contents of the application are incorporated herein by reference in its entirety.

BACKGROUND

Cameras can capture images within the camera's field-of-view. Cameras may be configured to capture data representing color images, i.e., Red-Green-Blue (RGB) images, infrared images, and/or depth images. In some implementations, cameras capture depth frame data by transmitting a near-infrared light over a portion of the camera's field-of-view and determine a time of flight (TOF) associated with the transmitted light. Some cameras also capture infrared images by detecting and measuring the infrared energy of objects within the camera's field-of-view.

SUMMARY

A system includes a computer including one or more processors and memory. The memory includes instructions such that the one or more processors are programmed to receive at least one of Red-Green-Blue (RGB) image data or infrared (IR) image data from one or more cameras communicatively connected to the one or more processors. The RGB image data and the IR image data represents an environment including at least one individual disposed along a support surface. The one or more processors receive annotated depth image data that corresponds to the RGB image data and the IR image data. The one or more processors train a neural network with at least one of the RGB image data and the IR image data corresponding to the annotated depth image data, where the neural network is trained to predict when the at least one individual is exiting the support surface.

In another aspect, the one or more processors are further programmed to train the neural network by receiving training data and training labels, wherein the training data comprises depth image frames and the training labels comprise annotations pertaining to objects within the training data.

In yet another aspect, the one or more processors are further programmed to train the neural network by associating the training data with either the RGB image data or the IR image data based on one or more mapping techniques.

In an aspect, the one or more processors are further programmed to train the neural network by training the neural network for a predetermined number of epochs based on the training data and the training labels, where at least one of one or more weights and one or more parameters of the neural network are updated according to a loss function of the neural network.

In another aspect, the one or more processors are further programmed to train the neural network by comparing an output of the neural network with ground truth to determine a calculated loss.

In yet another aspect, in response to determining the calculated loss is greater than a predetermined loss threshold, the one or more processors update at least one of the one or more weights and the one or more parameters of the neural network.

In an aspect, in response to determining the calculated loss is below or equal to a predetermined loss threshold, the one or more processors cease training the neural network.

In another aspect, the one or more processors are further programmed to map pixels of the depth image data to at least one of pixels of the at least one of the RGB image data or the IR image data.

In yet another aspect, the one or more processors are further programmed to update at least one weight or parameter of the neural network.

In an aspect, the neural network comprises a convolutional neural network.

In another aspect, the support surface is one of a chair and a bed.

In yet another aspect, the at least one of the RGB image data or the IR image data depict personally-identifiable information (PII).

In an aspect, the at least one individual is a patient in a medical environment.

In another aspect, a method is disclosed and includes receiving, by one or more processors, at least one of Red-Green-Blue (RGB) image data or infrared (IR) image data from one or more cameras communicatively connected to the one or more processors, where the RGB image data and the IR image data represents an environment including at least one individual disposed along a support surface. The method includes receiving, by the one or more processors, annotated depth image data that corresponds to the RGB image data and the IR image data. The method includes training, by the one or more processors, a neural network with at least one of the RGB image data and the IR image data corresponding to the annotated depth image data, where the neural network is trained to predict when the individual is exiting the support surface.

In another aspect, the method further includes receiving training data and training labels, wherein the training data comprises depth image frames and the training labels comprise annotations pertaining to objects within the training data.

In yet another aspect, the method further includes associating the training data with either the RGB image data or the IR image data based on one or more mapping techniques.

In an aspect, the method further includes training the neural network for a predetermined number of epochs based on the training data and the training labels, where at least one of one or more weights and one or more parameters of the neural network are updated according to a loss function of the neural network.

In another aspect, the method further includes comparing an output of the neural network with ground truth to determine a calculated loss.

In yet another aspect, in response to determining the calculated loss is greater than a predetermined loss threshold, the method includes updating at least one of the one or more weights and the one or more parameters of the neural network.

In an aspect, in response to determining the calculated loss is below or equal to a predetermined loss threshold, the method includes ceasing training the neural network.

DETAILED DESCRIPTION

The present disclosure is directed to a privacy preservation system that trains neural networks using annotated depth data. The neural networks can be used by systems that monitor environments, such as medical environments. For instance, the neural networks can be provided with depth data that is annotated offsite to mitigate inadvertent release of personally-identifiable information. For instance, Red-Green-Blue (RGB) image frames and/or infrared (IR) image frames may depict personally-identifiable information. The annotated depth data can be associated, e.g., matched, with corresponding RGB image frames and/or IR image frames. The neural network can then be trained to predict whether an individual, such as a patient, is exiting a support surface using the annotated depth data. In various implementations, the annotated depth data pixels can be mapped to the corresponding RGB image frames and/or IR image frames. In these implementations, the annotations can then be associated with the objects depicted by those pixels within the RGB image frames and/or IR image frames.

Figure 1:
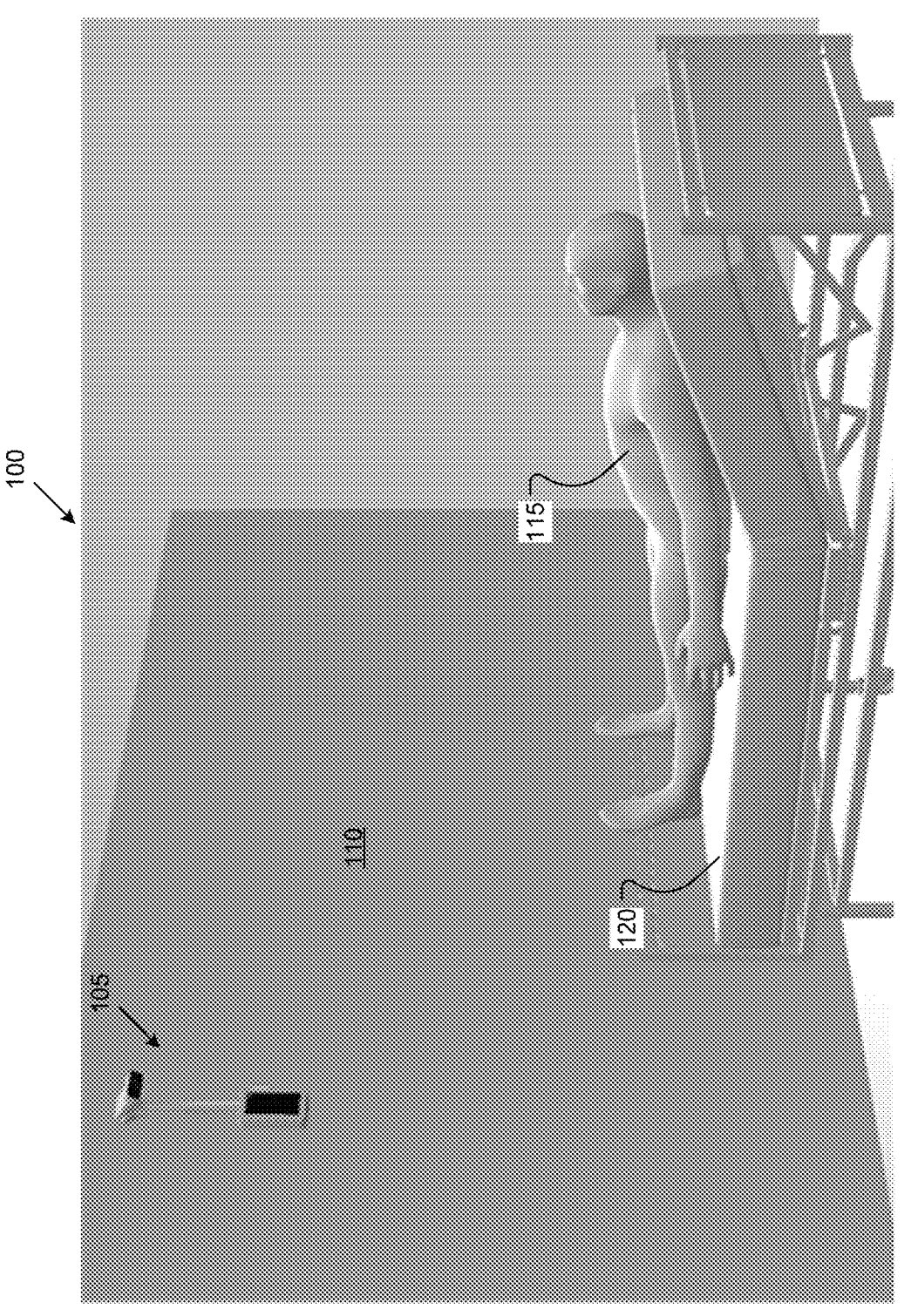
FIG. 1 is a diagrammatic illustration an example monitoring system for monitoring an environment.

FIG. 1 is a block diagram of an example environment 100 that includes a monitoring system 105, which is explained in greater detail below. As shown, the monitoring system 105 can be mounted to a structure 110, such as a wall. The monitoring system 105 is configured to monitor the environment 100 that can include at least one individual 115, such as a patient, and to predict whether the individual is exiting a support surface 120. While the support surface 120 is illustrated as a bed, it is understood that the support surface 120 may comprise other objects that can support the individual 115, such as a chair.

Figure 2:
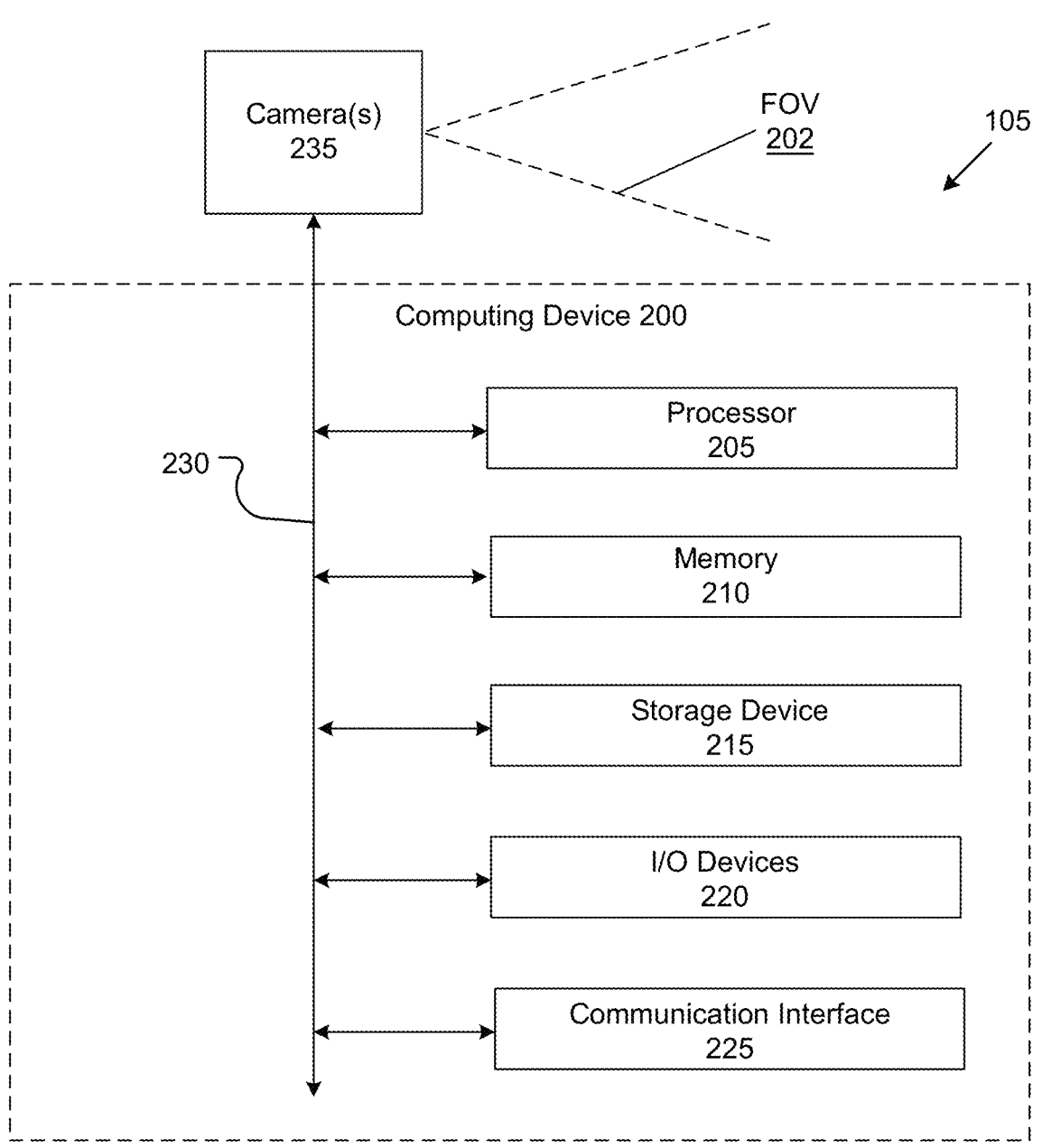
FIG. 2 is a block diagram of a computing device.

FIG. 2 illustrates an example computing device 200 included in the monitoring system 105 and that may be configured to perform one or more of the processes described herein. As shown, the computing device 200 can comprise a processor 205, memory 210, a storage device 215, an I/O interface 220, and a communication interface 225. Furthermore, the computing device 200 can include an input device such as a touchscreen, mouse, keyboard, etc. In certain implementations, the computing device 200 can include fewer or more components than those shown in FIG. 2.

In particular implementations, processor(s) 205 includes hardware for executing instructions, such as those making up a computer program. As an example, and not by way of limitation, to execute instructions, processor(s) 205 may retrieve (or fetch) the instructions from an internal register, an internal cache, memory 210, or a storage device 215 and decode and execute them.

The computing device 200 includes memory 210, which is coupled to the processor(s) 205. The memory 210 may be used for storing data, metadata, and programs for execution by the processor(s). The memory 210 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 210 may be internal or distributed memory.

The computing device 200 includes a storage device 215 includes storage for storing data or instructions. As an example, and not by way of limitation, storage device 215 can comprise a non-transitory storage medium described above. The storage device 215 may include a hard disk drive (HDD), flash memory, a Universal Serial Bus (USB) drive or a combination of these or other storage devices.

The computing device 200 also includes one or more input or output ("I/O") devices/interfaces 220, which are provided to allow a user to provide input to (such as user strokes), receive output from, and otherwise transfer data to and from the computing device 200. These I/O devices/interfaces 220 may include a mouse, keypad or a keyboard, a touch screen, camera, optical scanner, network interface, modem, other known I/O devices or a combination of such I/O devices/interfaces 220. The touch screen may be activated with a writing device or a finger.

The I/O devices/interfaces 220 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 220 is configured to provide graphical data to a display for presentation to a user. The graphical data may be representative of one or more graphical user interfaces and/or any other graphical content as may serve a particular implementation.

The computing device 200 can further include a communication interface 225. The communication interface 225 can include hardware, software, or both. The communication interface 225 can provide one or more interfaces for communication (such as, for example, packet-based communication) between the computing device and one or more other computing devices 300 or one or more networks. As an example, and not by way of limitation, communication interface 225 may include a network interface controller (NIC) or network adapter for communicating with an Ethernet or other wire-based network or a wireless NIC (WNIC) or wireless adapter for communicating with a wireless network, such as a WI-FI. The computing device 200 can further include a bus 230. The bus 230 can comprise hardware, software, or both that couples components of computing device 200 to each other.

The monitoring system 105 also includes one or more cameras 235 that are communicatively connected to the computing device 200. The cameras 235 are configured to capture images and per-pixel depth information in a field-of-view (FOV) of the cameras 235. In an implementation, the cameras 235 may be depth cameras, such as Red-Green-Blue depth (RGB-D) cameras operable to capture depth image data representing one or more depth images and to capture color image data representing one or more color (RGB) images, i.e., a depth image sensor. In an embodiment, the cameras 235 may include, but are not limited to: a near infrared light configured to generate a near infrared light pattern onto the objects within the FOV, a depth image complementary-metal-oxide-semiconductor (CMOS) sensor device configured to measure the depth of each object within the FOV, and a color image CMOS camera device.

The cameras 235 may also comprise an infrared (IR) image sensor that is configured to obtain infrared (IR) images within a field-of-view of camera 202. For instance, the cameras 235 can emit active IR light in an IR light sub-band. The cameras 235 may capture and/or collect image data of a thermal infrared image based on infrared radiation emitted by objects. In other words, each pixel also comprises an infrared (IR) value representing thermal energy detected by the cameras 235. For example, the infrared value can comprise a numerical value representing the thermal energy corresponding to the pixel.

It is understood that the IR images and the depth images comprise a plurality of pixels arranged within a coordinate system, such as a Cartesian coordinate system. For example, the plurality of pixels can each comprise a corresponding x- and y-coordinates. In other words, a depth image pixel has a corresponding IR image pixel based on the same x- and y-coordinates.

Figure 3:
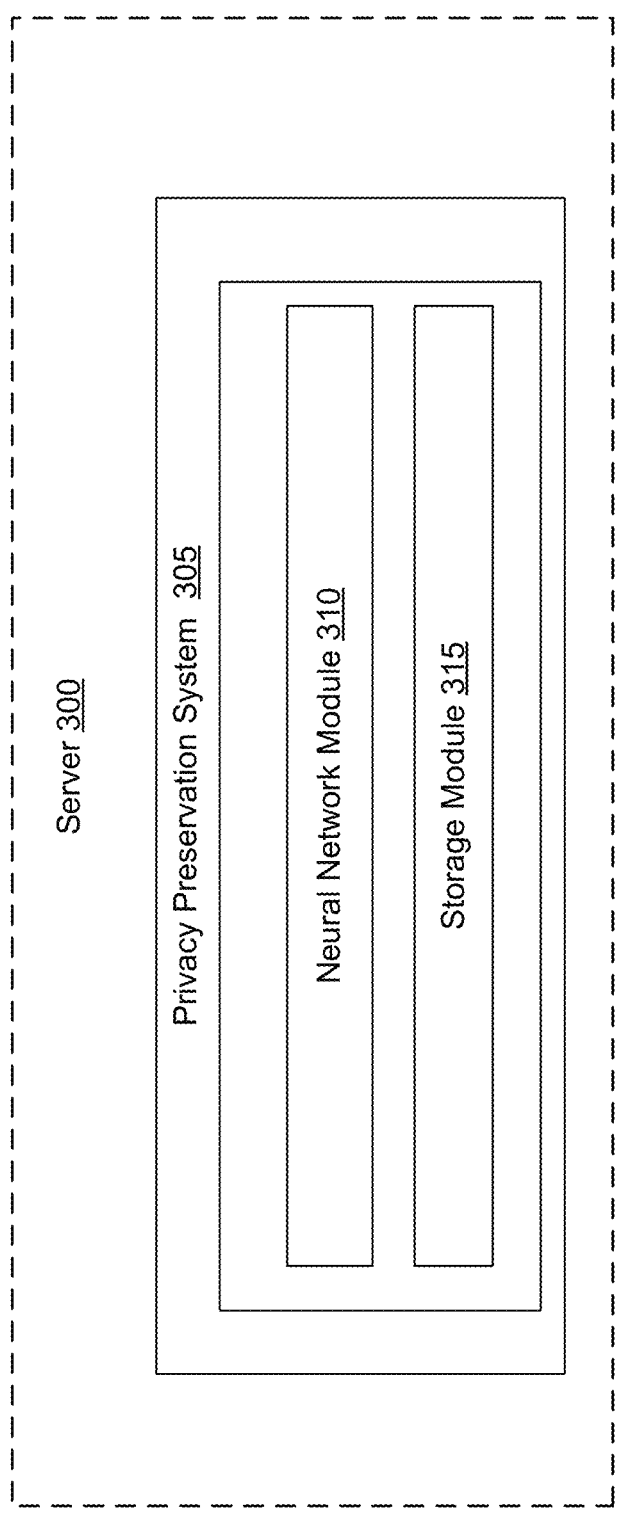
FIG. 3 is a block diagram of a server for training a neural network.

FIG. 3 illustrates an example server 300 that includes privacy preservation system 305. The server 300 may comprise a computing device 200 associated with an entity, such as a medical entity, such as a hospital, a care facility, or the like. As shown, the privacy preservation system 305 may include a neural network module 310 and a storage module 315.

The neural network module 310 can manage, maintain, train, implement, utilize, or communicate with one or more neural networks. For example, the neural network module 310 can communicate with the storage module 315 to access a neural network stored within a data structure. In other examples, the neural network module 310 may train or re-train neural networks based on received depth data.

The depth data can comprise received labeled depth data that corresponds to stored RGB images and/or IR images. In this example, the depth data can be sent off-site, i.e., another entity or computing device not associated with the server 300. Within this context, the RGB images and/or IR images that may depict personally-identifiable information (PII) are maintained within the server 300 associated with the entity. In other words, depth data, which does not include PII, is transmitted to another computing device for the purposes of labeling, i.e., annotating.

Once labeled, the depth data is transmitted to the server 300. The neural network module 310 can associated depth data frames with corresponding RGB image frames and/or IR image frames. In an example implementation, each image frame can include a frame identifier. In this implementation, the neural network module 310 associates the labeled depth data frame with the corresponding RGB image frame and/or IR image frame. Once the image frames are associated, the neural network module 310 can train one or more neural networks using the labeled depth data.

Figure 4:
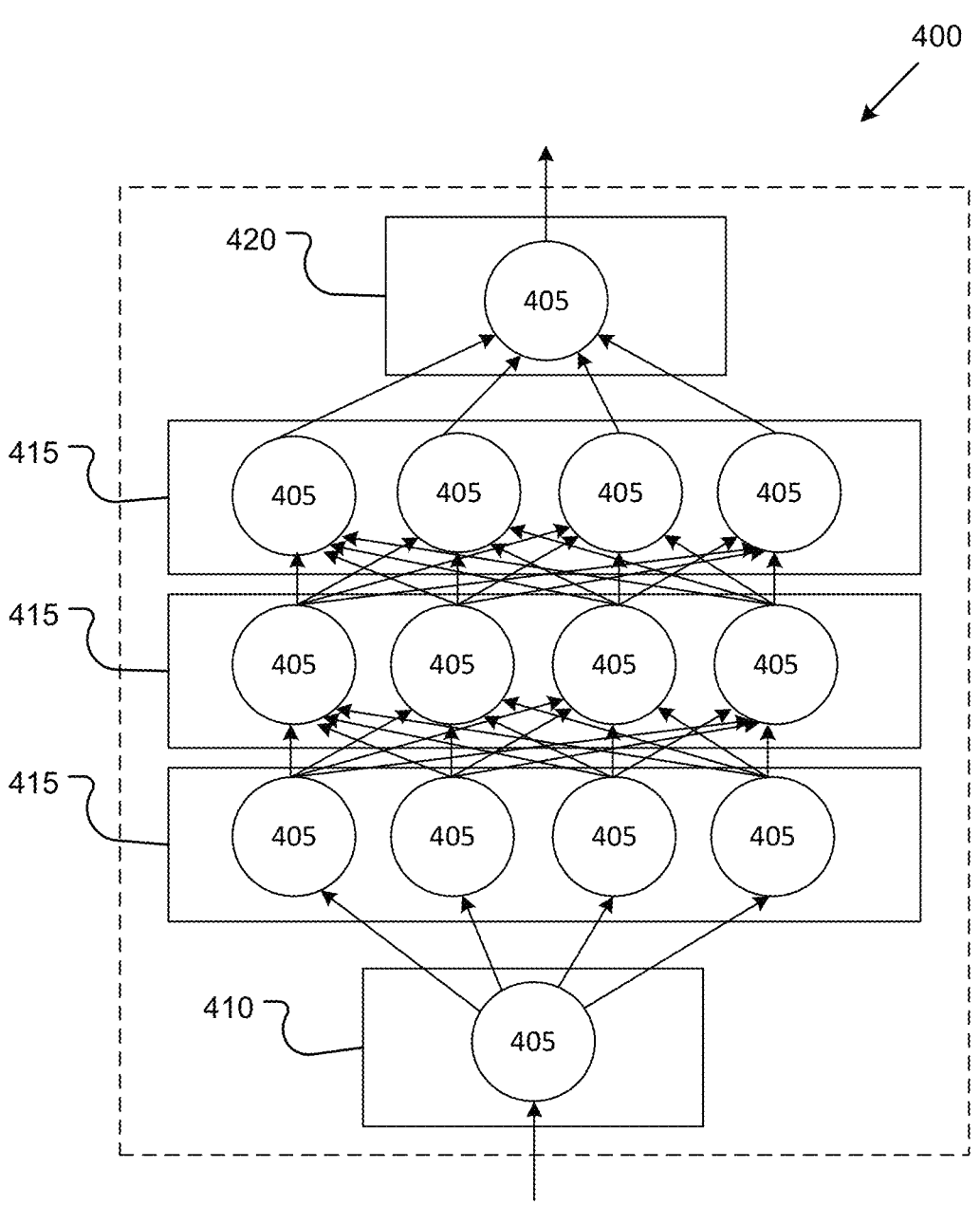
FIG. 4 is a diagram of an example neural network.

FIG. 4 is a diagram of an example deep neural network (DNN) 400 that may be used herein. The DNN 400 includes multiple nodes 405, and the nodes 405 are arranged so that the DNN 400 includes an input layer 410, one or more hidden layers 415, and an output layer 420. Each layer of the DNN 400 can include a plurality of nodes 405. While FIG. 4 illustrates three (3) hidden layers 415, it is understood that the DNN 400 can include additional or fewer hidden layers. The input and output layers 410, 420 may also include more than one (1) node 405.

The nodes 405 are sometimes referred to as artificial neurons, because they are designed to emulate biological, e.g., human, neurons. A set of inputs (represented by the arrows) to each node 405 are each multiplied by respective weights. The weighted inputs can then be summed in an input function to provide, possibly adjusted by a bias, a net input. The net input can then be provided to activation function, which in turn provides a connected node 405 an output. The activation function can be a variety of suitable functions, typically selected based on empirical analysis. As illustrated by the arrows in FIG. 4, node 405 outputs can then be provided for inclusion in a set of inputs to one or more neurons 405 in a next layer.

The DNN 400 can be trained to accept data as input and generate an output based on the input. In one example, the DNN 400 can be trained with ground truth data, i.e., data about a real-world condition or state. For instance, the DNN 400 can be trained with ground truth data or updated with additional data by a processor. Weights can be initialized by using a Gaussian distribution, for example, and a bias for each node 405 can be set to zero. Training the DNN 400 can including updating weights and biases via suitable techniques such as backpropagation with optimizations. Ground truth data can include, but is not limited to, data specifying objects within an image or data specifying a physical parameter, e.g., angle, speed, distance, color, hue, or angle of object relative to another object. For example, the ground truth data may be data representing objects and object labels. In one or more example implementations, the DNN 400 comprises a convolutional neural network.

Figure 5A:
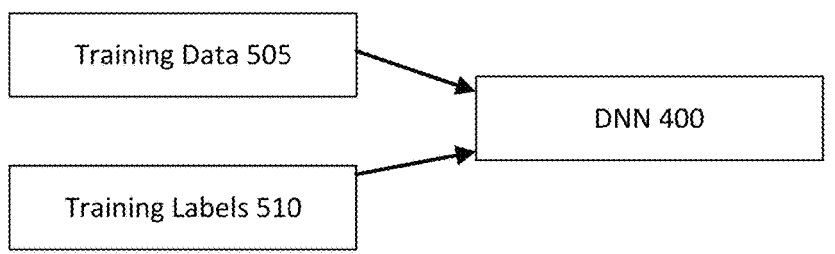
FIGS. 5A through 5C are block diagrams illustrating an example process for training one or more neural networks.
Figure 5B:
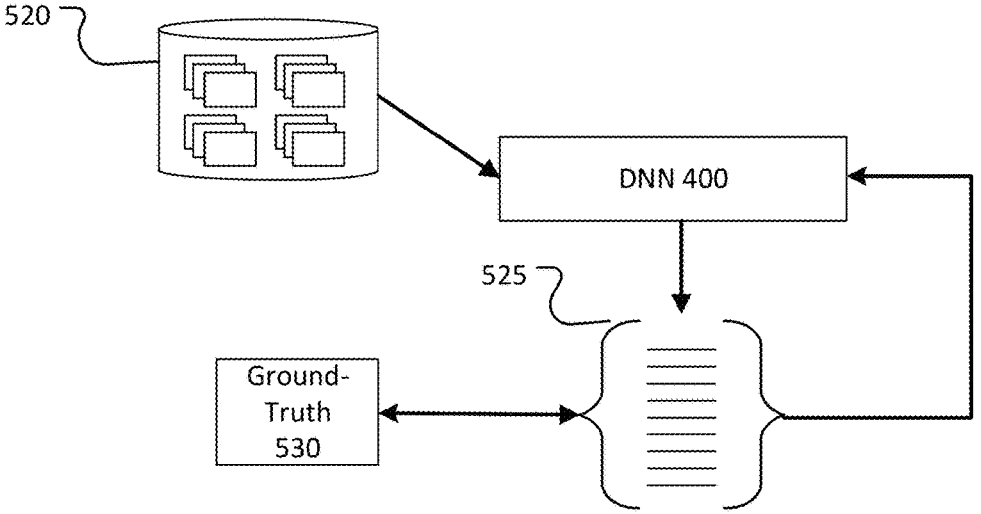

FIGS. 5A and 5B illustrate an example process for training the DNN 400 in accordance with one or more implementations of the present disclosure. As shown in FIG. 5A, during an initial training phase, a DNN 400 receives training data 505 and training labels 510. The training data 505 can comprise depth frame images, and the training labels 510 may comprise object labels, object type labels, and/or distance of the object with respect to the source of the image. It is understood that the training data 505 and the training labels 510 are associated with corresponding RGB image frames and/or IR image frames. For instance, a one-to-one mapping of depth frame pixels to RGB image frame pixels and/or IR image frame pixels. Based on the pixel mapping, the training labels 510 are associated with the corresponding RGB image frames and/or IR image frames. Thus, the training data 505 can also further include RGB image frames and/or IR image frames.

After the initial training phase, at a supervised training phase, a set of N training data 520 is input to the DNN 400. The set of N training data 520 can comprise RGB images and/or IR images. The DNN 400 generates predictions for each of the N training data 520 inputs. FIG. 5B illustrates an example of generating output based on training data 520, e.g., non-labeled training images, of the N training data 520. Based on the initial training, the DNN 400 outputs a vector representation 525 of the output. The vector representation 525 is compared to ground-truth data 530.

The DNN 400 updates network parameters based on the comparison to the ground-truth data 530. For example, the network parameters, e.g., weights associated with the neurons, may be updated via backpropagation.

Figure 5C:
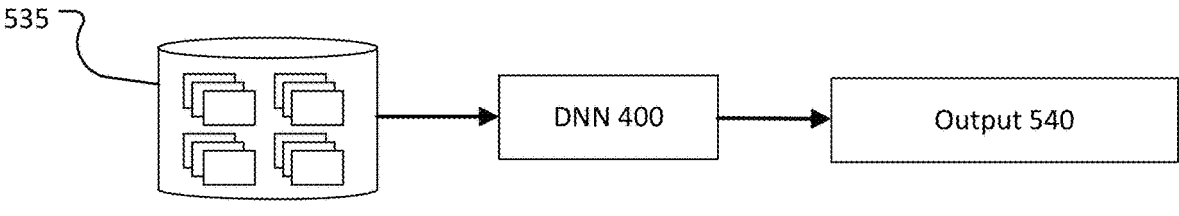

This process described can occur multiple times. For example, the process can continue until a desired accuracy is achieved or a desired loss convergence is achieved. Once trained, the DNN 400 can be provided to the monitoring system 105 to monitor patient activity within the environment 100. For example, as shown in FIG. 5C, image frame data 535 is received at the DNN 400. Based on the image frame data 535, the DNN 400 generates output 540 that can include, but is not limited to, a prediction that a patient is exiting the support surface 120.

Figure 6:
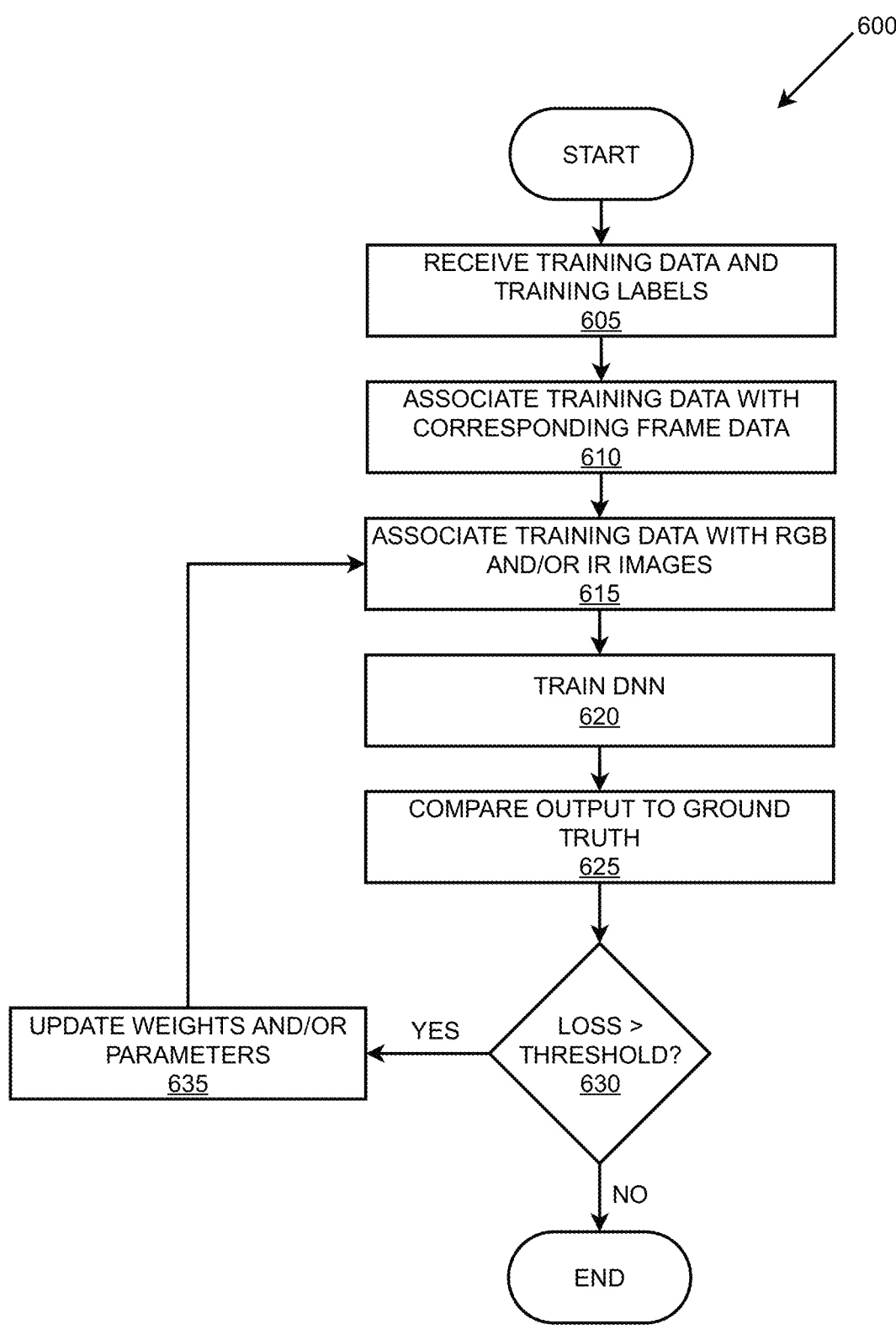
FIG. 6 is a flow diagram illustrating an example process for training a neural network with off-site annotated depth data.

FIG. 6 illustrates an example process 600 for training a DNN 400 according to the techniques described herein. Blocks of the process 600 can be executed by the server 300. The process 600 begins at block 605 in which training data and training labels are received. As discussed above, the training data can comprise depth image frames, and the training labels can comprise annotations pertaining to objects within the training data.

At block 610, the training data is associated with corresponding image frame data. For example, annotated depth data is associated with corresponding RGB data and/or IR data according to suitable mapping techniques. At block 615, the DNN 400 is trained for a predetermined number of epochs using the training data and the training labels. During this training, one or more weights and/or parameters of the DNN 400 can be updated according to a loss function of the DNN 400. At block 620, RGB image frames and/or IR image frames are provided to the DNN 400. At block 625, the output of the DNN 400 is compared to ground truth.

At block 630, a determination is made whether a calculated loss based on the comparison is below a predetermined loss threshold. If the calculated loss is greater than the predetermined loss threshold, the weights and/or parameters of the DNN 400 are updated at block 635. The process 600 then transitions to block 615. If the calculated loss is below or equal to the predetermined loss threshold, the process 600 ends.

It is understood that the suitable federated learning techniques and/or differential privacy techniques can be used to share neural network model updates between medical facilities to mitigate the release of PII data. Additionally or alternatively, neural network models can tailored for particular medical environments and/or on-the-fly based on the techniques described herein.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including one or more processors and memory, the memory including instructions such that the one or more processors are programmed to:

receive at least one of Red-Green-Blue (RGB) image data or infrared (IR) image data from one or more cameras communicatively connected to the one or more processors, wherein the RGB image data or the IR image data represents an environment including at least one individual disposed along a support surface;

receive annotated depth image data that corresponds to the at least one of the RGB image data or the IR image data; and train a neural network with the received annotated depth image data and the received at least one of the RGB image data or the IR image data corresponding to the annotated depth image data, wherein the neural network is trained to predict when the at least one individual is exiting the support surface.

2. The system as recited in claim 1, wherein the one or more processors are further programmed to train the neural network by:

receiving training data and training labels, wherein the training data comprises depth image frames and the training labels comprise annotations pertaining to objects within the training data.

3. The system as recited in claim 2, wherein the one or more processors are further programmed to train the neural network by:

associating the training data with either the RGB image data or the IR image data based on one or more mapping techniques.

4. The system as recited in claim 3, wherein the one or more processors are further programmed to train the neural network by:

training the neural network for a predetermined number of epochs based on the training data and the training labels, wherein at least one of one or more weights and one or more parameters of the neural network are updated according to a loss function of the neural network.

5. The system as recited in claim 4, wherein the one or more processors are further programmed to train the neural network by:

comparing an output of the neural network with ground truth to determine a calculated loss.

6. The system as recited in claim 5, wherein the one or more processors are further programmed to train the neural network by:

in response to determining the calculated loss is greater than a predetermined loss threshold, updating at least one of the one or more weights and the one or more parameters of the neural network.

7. The system as recited in claim 5, wherein the one or more processors are further programmed to train the neural network by:

in response to determining the calculated loss is below or equal to a predetermined loss threshold, cease training the neural network.

8. The system as recited in claim 1, wherein the one or more processors are further programmed to map pixels of the depth image data to at least one of pixels of the at least one of the RGB image data or the IR image data.

9. The system as recited in claim 1, wherein the one or more processors are further programmed to update at least one weight or parameter of the neural network.

10. The system as recited in claim 1, wherein the neural network comprises a convolutional neural network.

11. The system as recited in claim 1, wherein the at least one of the RGB image data or the IR image data depict personally-identifiable information (PII).

12. The system as recited in claim 1, wherein the at least one individual is a patient in a medical environment.

13. A method, comprising:

receiving, by one or more processors, at least one of Red-Green-Blue (RGB) image data or infrared (IR) image data from one or more cameras communicatively connected to the one or more processors, wherein the RGB image data or the IR image data represents an environment including at least one individual disposed along a support surface;

receiving, by the one or more processors, annotated depth image data that corresponds to the at least one of the RGB image data or the IR image data; and training, by the one or more processors, a neural network with the received annotated depth image data and the received at least one of the RGB image data and the IR image data corresponding to the annotated depth image data, wherein the neural network is trained to predict when the individual is exiting the support surface.

14. The method of claim 13, further comprising:

receiving training data and training labels, wherein the training data comprises depth image frames and the training labels comprise annotations pertaining to objects within the training data.

15. The method of claim 14, further comprising:

associating the training data with either the RGB image data or the IR image data based on one or more mapping techniques.

16. The method of claim 15, further comprising:

training the neural network for a predetermined number of epochs based on the training data and the training labels, wherein at least one of one or more weights and one or more parameters of the neural network are updated according to a loss function of the neural network.

17. The method of claim 16, further comprising:

comparing an output of the neural network with ground truth to determine a calculated loss.

18. The method of claim 17, further comprising:

in response to determining the calculated loss is greater than a predetermined loss threshold, updating at least one of the one or more weights and the one or more parameters of the neural network.

19. The method of claim 17, further comprising:

in response to determining the calculated loss is below or equal to a predetermined loss threshold, ceasing training the neural network.

20. A system comprising a first computer and a second computer, each including one or more processors and memory, the memory including instructions such that the one or more processors are programmed to:

receive at least one of Red-Green-Blue (RGB) image data or infrared (IR) image data from one or more cameras communicatively connected to the one or more processors of the first computer, wherein the RGB image data or the IR image data represents an environment including at least one individual disposed along a support surface;

receive depth image data that corresponds to the at least one of the RGB image data or the IR image data, wherein the received depth image data does not include personally-identifiable information (PII) of the at least one individual, the second computer configured to receive the depth image data;

annotate the received depth image data, the second computer configured to annotate the received depth image data;

receive the annotated depth image data, the first computer configured to receive the annotated depth image data from the second computer;

train a neural network based on the received annotated depth image data and the received at least one of the RGB image data or the IR image data, wherein the neural network is trained to predict when the at least one individual is exiting the support surface.

\* \* \* \* \*